Patented June 10, 1941

2,244,710

UNITED STATES PATENT OFFICE 2,244,710

PROCESS FOR THE MANUFACTURE OF HYDROCARBONS FROM CARBON MONOXIDE AND HYDROGEN

Herbert Kölbel, Moers, Germany, assignor, by mesne assignments, to Koppers Company, Pittsburgh, Pa., a corporation of Delaware No Drawing. Application September 22, 1938, Serial No. 231,275. In Germany September 23, 1937

5 Claims. (Cl. 260—449)

The present invention relates to the manufacture of hydrocarbon mixtures suitable for use as motor fuel or as lubricating means, by the reaction of a gas containing hydrogen and carbon monoxide while passing over catalysts at increased temperatures for instance about 200 degrees centigrade and at either normal or moderately increased or reduced pressure.

In the following specification and claims I use the word "synthesis gas" for specifying gases containing hydrogen and carbon monoxide as suitable for the catalytic formation of said hydrocarbons.

The main object of my present invention is to provide such improvements which will render possible the immediate manufacture of valuable hydrocarbon mixtures by the use of ordinary coke water gas or gases of similar composition without a previous conversion of such gases.

For the synthesis of hydrocarbon mixtures from hydrogen and carbon monoxide or gases (water gas) containing such compounds, cobalt or nickel catalysts are preferably used. Such catalysts give a high yield of valuable hydrocarbons.

The formation of hydrocarbons by means of cobalt or nickel catalysts requires principally a synthesis gas which contains carbon monoxide and hydrogen in the proportion of 1:2 in order to obtain the maximum yield and the best quality of hydrocarbons.

The normal water gas made from coke and produced in the well known discontinuous water gas process contains, however, carbon monoxide and hydrogen in the proportion of approximately 1:1 to 1:1.25. If such a gas is to be completely utilized for the catalytic production of hydrocarbons, as is necessary from an economical point of view, said gas has to be suitably treated before coming into contact with the catalyst. It is for instance possible to convert a part of the carbon monoxide into carbon dioxide and to separate the latter from the gases, or to add hydrogen from another source to the normal water gas, for example hydrogen formed by decomposing coal distillation gases or the like. Such a treatment of the water gas results, however, in considerably increased costs for the production of synthesis gas.

Furthermore the sulphur compounds have practically to be completely removed from the synthesis gas before coming into contact with the cobalt or nickel catalyst in order to prevent a poisoning of the catalysts and a reduction of their efficiency. The complete removal of sulphur compounds from synthesis gas on an industrial scale offers, however, considerable difficulties and up to now this problem has not yet been properly solved.

With the methods used heretofore it is possible to reduce the total sulphur content of the synthesis gas down to about 0.2 to 0.6 gram S per 100 cu. m. of gas. It was, however, found that even such a comparatively low content of sulphur endangers a cobalt or nickel catalyst to such an extent, that after about 2000 operating hours, the efficiency of the catalyst treated with a gas containing the above amount of sulphur or sulphur compounds is reduced by about 40 to 50% if compared with a catalyst which has been treated with a synthesis gas completely free from sulphur and sulphur compounds.

Now, the process of the present invention principally consists in manufacturing useful hydrocarbon mixtures by treating a synthesis gas consisting of water gas or other gases which contain carbon monoxide and hydrogen but not in the proportion of one volume carbon monoxide to two volumes of hydrogen, said synthesis gas being freed almost completely from the dangerous sulphur compounds in the usual manner in two stages in the presence of catalysts, namely in a primary stage in the presence of a catalyst containing iron and then in a second stage in the presence of a catalyst containing cobalt or nickel whereby the hydrocarbons produced in the first stage are removed before the treatment of the gas in the second stage. According to my invention the residual gas of the first stage of the process may also be mixed with an adjustable quantity of untreated synthesis gas if necessary in order to obtain for the second stage of the process a gas mixture of the desired composition.

The process according to my invention substantially works as follows:

In the first stage of the process, the reduction of carbon monoxide by means of iron catalysts takes place principally in accordance with the following equation of reaction:

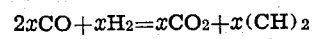
$$2xCO + xH_2 = xCO_2 + x(CH)_2$$

By this reaction, double the volume of carbon monoxide based upon hydrogen is used so that a residual gas with an increased amount of hydrogen is produced in the first stage.

During the second stage of the process, the carbon monoxide is, however, reduced according to the following equation:

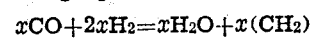
$$xCO + 2xH_2 = xH_2O + x(CH_2)$$

By this reaction double the volume of hydrogen is needed per volume of carbon monoxide.

When based upon a synthesis gas containing equal volumes of carbon monoxide and hydrogen, for instance an ordinary coke water gas, it is possible to attain the effect, by a suitable carrying out of the reactions in the two stages of the process according to the invention, of having the carbon monoxide and the hydrogen contained in the synthesis gas fully utilized for the formation of hydrocarbons in the sense of the above equations without any preliminary treatment or conversion of the synthesis gas.

Furthermore, the process according to the invention may be carried out in such a way that more carbon monoxide is consumed during the first stage of the process than corresponds to the quantity required to produce a residual gas which contains CO and $H_2$ in the proportion of 1 volume carbon monoxide to 2 volumes hydrogen. This mode of carrying out the process according to the present invention offers the advantage that a certain quantity of untreated synthesis gas or another suitable gas may be added to the residual gas of the first stage of the process so that a greater volume of mixed gas is obtained for the second stage of the process. It is even possible to extract carbon dioxide from the residual gas between the two stages of the process so as to reduce the content of inerts of the gas. The latter mode of carrying out the present invention is of special advantage if one or the other of the stages of the process, or both of them, are run at an increased pressure. Moreover according to the invention it is possible to subdivide the two fundamental stages of the process, so that the synthesis gas may be brought into contact once or several times with iron catalysts together, with the intermediate removal of the hydrocarbons produced, and/or correspondingly with the cobalt or nickel catalysts in the second stage of the process.

Another essential feature of the process according to the present invention resides in the fact that the industrial use of the iron catalyst in connection with the synthesis of the hydrocarbons is rendered possible in an exceptionally economical way and moreover products are obtained which are superior to the hydrocarbon mixtures formed by means of cobalt or nickel catalysts exclusively.

As already known the iron catalyst produces a hydrocarbon mixture which contains about 50% more valuable olefines than the reaction product of the conversion by means of cobalt or nickel catalysts. The principal cause of not having used the iron catalyst up to now in practical operation, in spite of this advantage, and instead of this nearly exclusively the cobalt or nickel catalysts have been made use of consists in that, on the one hand, the iron catalyst gives a considerably lower yield of valuable hydrocarbons and on the other hand, such a high content of carbon monoxide as is required in a synthesis gas suitable for the iron catalysts can only be maintained in industrial gases with great difficulty. Both these disadvantages of the iron catalyst are completely eliminated according to the present invention by compensating for the higher consumption of carbon monoxide of the iron catalyst through the use of the weaker cobalt or nickel catalysts used during the second stage of the process, and furthermore the comparatively low yield of the iron catalyst in hydrocarbons, i. e., the low utilization of the synthesis gas is compensated by the higher yield from the catalyst operating in the second stage.

Finally an important advantage of the iron catalyst against the cobalt or nickel catalysts is its low manufacturing cost. This fact has a special effect when treating the gases which are not completely freed from dangerous sulphur compounds. Iron as well as cobalt and nickel catalysts are poisoned by the sulphur compounds fairly soon. As, however, the synthesis gas according to the present invention first of all comes into contact with the cheap and easily replaceable iron catalysts and gives off nearly completely all the dangerous sulphur compounds to these iron catalysts, the valuable cobalt or nickel catalysts of the second stage of the process are taken care of and their full efficiency is maintained.

When compared with the well known conversion of the carbon monoxide into carbon dioxide by means of steam before coming into contact with the catalysts, the process according to my invention first of all offers the advantage of a higher yield of valuable hydrocarbons. Thus one obtains for instance about 96 grams of hydrocarbon oils from one cubic meter of water gas containing 38.6% CO and 43% $H_2$, the CO-content of which has been partly converted with steam so that the proportion of CO to $H_2$ is brought to 1:2, while the yield of hydrocarbon oils according to the process of my present invention amounts to 98 to 99 grams.

The carrying out of the process according to the invention in practical operation is exemplified as follows:

One cubic meter of water gas of the following composition: 5.3% $CO_2$, 0.3% $C_nH_{2n}$, 0.3% $O_2$, 38.6% CO, 43% $H_2$, 4% $C_nH_{2n+2}$, 8.5% $N_2$, is conducted at a temperature of 228 to 235 degrees centigrade over a catalyst consisting of iron and a copper mixture which contains 2.5 kg. of iron at a velocity of flow of 1 cu. m. per hour. One thereby obtains 55 grams of a hydrocarbon oil with an average of 50% olefines and 700 liters of a gas of the following composition: 27.7% $CO_2$, 1.7% $C_nH_{2n}$, 0.1% $O_2$, 13% CO, 38.7% $H_2$, 8.3% $C_nH_{2n+2}$, 10.5% $N_2$. The carbon dioxide is extracted and 53 parts of synthesis gas are added to the residual gas (see analysis 1). One obtains 774 liters of a gas of the following composition: 1.8% $CO_2$, 1.6% $C_nH_{2n}$, 0.2% $O_2$, 25.1% CO, 50% $H_2$, 8.9% $C_nH_{2n+2}$, 12.4% $N_2$.

This gas is now passed over a cobalt thorium catalyst which contains about 0.8 kg. cobalt at a temperature of 185 to 200 degrees centigrade at a velocity of flow of about 800 liters per hour with the formation of 70 grams of a hydrocarbon oil with an average of 35% of olefines.

From one cubic meter of water gas which was first led over an iron catalyst and to which further 268 liters of water gas were added for the cobalt stage, one could obtain in total 125 grams of hydrocarbon oil or 98.6 grams per one cubic meter.

The synthesis gas contains 0.3 gram of sulphur per 100 cu. m. After leaving the iron catalyst, no sulphur could be found in the gas.

Synthesis gases with a higher content of CO and $H_2$ give correspondingly higher yields.

If, as mentioned above, the same water gas is only converted by means of cobalt catalysts using a cobalt quantity of 1.28 kg. per cu. m. gas, the activity of which corresponds to the quantity of cobalt used in the above test, there are only obtained 77 to 80 grams of hydrocarbon mixture per 1 cu. m. at similar conditions (185 to 200 degrees centigrade). In addition to a saving in the cost of cobalt, this means an increase of the yield of 23 to 28%.

For comparison, also the yield was determined which is obtained when the same quantity of water gas, the proportion of which is brought to 1 volume of carbon monoxide to 2 volumes of hydrogen by means of conversion, is led over a cobalt catalyst. When converting 423 liters of the above water gas by means of steam over an iron catalyst, one obtains in this manner 423 liters of gas of the following composition: 5.92% $CO_2$, 0.3% $C_nH_{2n}$, 0.3% $O_2$, 4% CO, 77% $H_2$, 4% $C_nH_{2n+2}$, 8.5% $N_2$.

This gas with 846 liters of the above water gas is added to 1269 liters of a gas of the following composition: 5.5% $CO_2$, 0.3% $C_nH_{2n}$, 0.3% $O_2$, 27.1% CO, 54.3% $H_2$, 4% $C_nH_{2n+2}$, 8.5% $N_2$. This mixed gas during the transfer of it over a suitable quantity of a cobalt catalyst (1.269 kg.) at 189 degrees centigrade in one hour gives 122.5 grams of a hydrocarbon oil, i. e. only 96.5 grams for each cubic meter of the water gas used. This yield is lower than with the process according to the invention.

A still further object of the present invention relates to improvements which will increase the life of the catalysts when used in connection with a synthesis gas containing sulphur and/or sulphur compounds in a process in which hydrocarbon mixtures are produced directly from coke water gas or other gases of which the proportion of carbon monoxide to hydrogen does not correspond to 1 volume of carbon monoxide to 2 volumes of hydrogen. The manufacture is effected in such a way that the raw water gas after the elimination of the dangerous sulphur compounds is first of all brought into contact with an iron catalyst and then in a second stage of the process with a cobalt or nickel catalyst, the hydrocarbons formed during the first stage being removed previously to the passage of the gas into the second stage and if necessary an adjustable quantity of untreated synthesis gas being added to the residual gas of the first stage of the process before passage into the second stage, in order to obtain a mixed gas of the desired composition.

The present invention comprehends an improvement of the process consisting in that the process is also adapted to the treatment of gases containing sulphur compounds for instance coke water gas which has not been fully freed from the dangerous sulphur constituents.

During the course of investigations, dealing with the use of gases which contain sulphur compounds it has been found that the iron catalyst is very sensitive against the effect even of very small quantities of sulphur during the first operating hours, but this sensitiveness against sulphur is diminished soon afterwards.

My invention eliminates this dangerous influence of the gas sulphur and the solution of this problem is attained by means of the present invention in that the iron catalyst is started with a gas free from sulphur and only later on the operation is changed over to the proper synthesis gas which mostly contains a low content of sulphur.

The invention offers the advantage that the formation or the so-called swelling of the catalyst necessary for the total efficiency and the life of the catalyst is not destroyed by the presence of dangerous sulphur compounds. If the iron catalyst has once obtained its full efficiency during the operation with a gas free from sulphur, it is nearly insensitive against low amounts of gas sulphur.

In this way, any iron catalyst which was started with a gas containing sulphur compounds only gave a yield of 17 grams liquid hydrocarbons for each cubic meter of gas after an operating time of 320 hours. The liquid hydrocarbons from the catalyst after the same period gave 50.6 grams of liquid hydrocarbons when it was operated, according to the invention, for 120 hours with a sulphur-free gas, and after this the operation was changed over to a gas containing the same amount of dangerous sulphur compounds.

For starting-up the process, a gas of a composition has proved as especially suitable, which gas has already once passed a catalyst of the 8th group of the periodical system (iron, cobalt and nickel) and which is practically free from sulphur.

The progress attained by this process results in a considerable increase of yield of liquid products (for instance from 17 grams to 50 grams per cu. m.) from carbon monoxide and hydrogen over iron catalysts and thus results in a more economical utilization of the synthesis gases which contain sulphur. The novel way of starting-up of the process with the iron catalyst to treat gas mixtures containing sulphur according to the invention is, of course, also advantageous in those events when the gas is not to be treated with a nickel or cobalt catalyst, as during the second stage.

*Example*

A catalyst mixture of iron and copper is operated at a temperature of 225 to 250 degrees centigrade with an almost sulphur-free gas containing about 28% CO and 56% $H_2$ for about 120 hours with a velocity of flow of 0.25 m.$^3$/hour and for 1 kg. of iron as a catalyst. After an operating time of 120 hours, the process is changed over to a similar gas which contains approximately 0.8 gram of sulphur per 100 cu. m. The yield of 50.6 grams of liquid products obtained after 320 hours from one cubic meter of synthesis gas is similar as if the catalyst is operated solely with a gas free from sulphur. The yield of liquid products amounts, however, only to 17 grams per 1 cu. m. if from the very beginning only the same catalyst has been operated with the gas which contains sulphur.

I have now above described my present invention on the lines of a preferred embodiment thereof, but my invention is not limited in all its aspects to the mode of carrying it out as described and shown, since the invention may be variously embodied within the scope of the following claims.

I claim:

1. In a process for the manufacture of hydrocarbons from gases containing carbon monoxide and hydrogen by means of catalysts of the 8th group of the periodic system the improvement comprising the flow of the synthesis gas mixture first of all over an iron catalyst, then effecting the removal of the hydrocarbons produced from the gas mixture treated, then further treating the gas in the presence of another metal of the 8th group as a catalyst for the production of additional hydrocarbons and finally separating from the gas the hydrocarbons formed.

2. In a process as set forth in claim 1, the addition to the gas mixture which has been treated in the first stage of the process in the presence of an iron catalyst of a sulphur-free gas mixture so that the resulting gas mixture treated in the second stage has the same composition as to CO and $H_2$ that gas in the first stage had.

3. In a process as set forth in claim 1, the addition to the gas mixture which has been treated in the first stage of the process in the presence of an iron catalyst of a gas mixture having the same content of hydrogen and carbon monoxide as the gas introduced to the first stage, and in which the gas is added in quantity to produce a gas mixture containing carbon monoxide and hydrogen in the proportion of one volume of carbon monoxide and two volumes of hydrogen for introduction to the second catalytic stage of the process.

4. A process to enable gases containing sulphur to be treated for the manufacture of hydrocarbons from carbon monoxide and hydrogen by leading the synthesis gas mixture first of all over an iron catalyst and then over a catalyst of the group consisting of cobalt and nickel comprising passing over the iron catalyst first of all a gas mixture which is free from sulphur and after the iron catalyst has attained its full efficiency changing over to passing over the iron catalyst the gas mixture containing sulphur.

5. In a process which enables gases containing sulphur to be treated for the manufacture of hydrocarbons from carbon monoxide and hydrogen when led over an iron catalyst, the steps comprising starting the process with a gas mixture free from sulphur, until the iron catalyst swells and becomes nearly insensitive to low amounts of sulphur, then treating gas mixtures containing low amounts of sulphur.

HERBERT KÖLBEL.